United States Patent Office 3,227,623
Patented Jan. 4, 1966

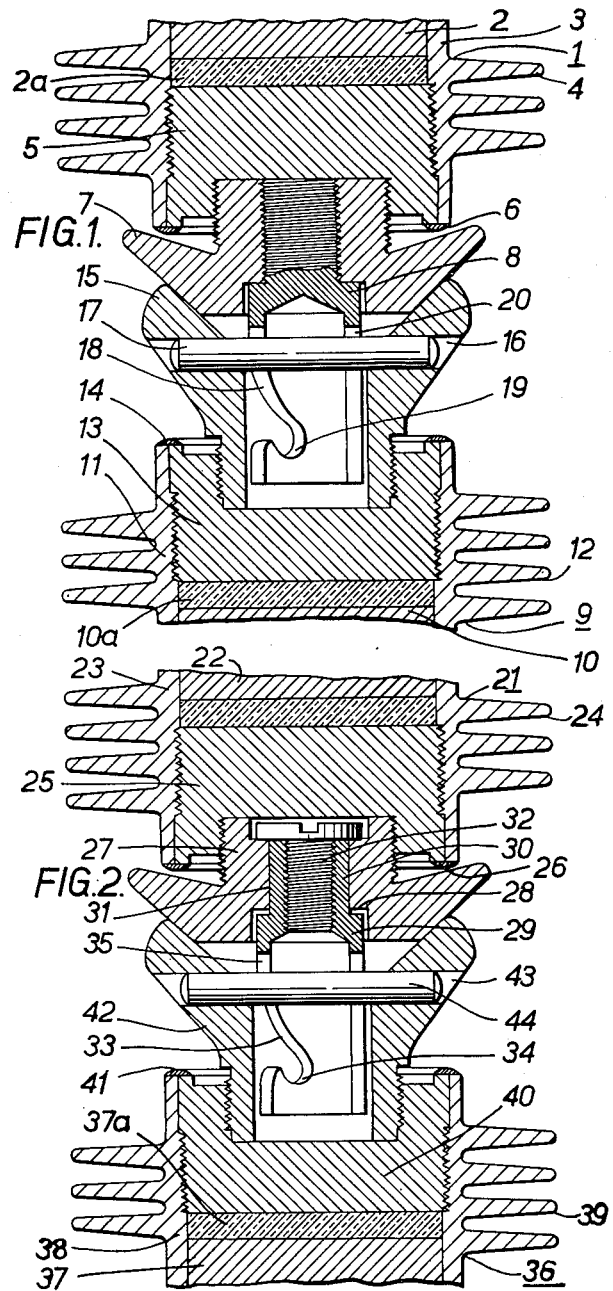

3,227,623
BAYONET SOCKET COUPLING MEANS FOR FUEL
ELEMENTS FOR NUCLEAR REACTORS
William P. White, Saughall, England, assignor to United
Kingdom Atomic Energy Authority, London, England
Filed Nov. 14, 1961, Ser. No. 152,328
Claims priority, application Great Britain, Nov. 15, 1960,
39,141/60
2 Claims. (Cl. 176—77)

This invention relates to fuel elements for nuclear reactors and it is an object of the invention to provide a fuel element which facilitates charging and discharging operations.

According to the invention a fuel element for a nuclear reactor has end coupling members for connecting the fuel element to similar fuel elements, the coupling members allowing the fuel elements to be charged into the reactor as an assembly of connected elements and discharged from the reactor individually.

The charging of an assembly of connected elements reduces the time required for the charging operation and also facilitates the attachment to the elements of ancillary equipment such as thermocouples used to measure the fuel temperature. The discharging of individual elements is advantageous, e.g. when moving fuel elements from one position in the reactor to another to achieve even burn-up of the fuel.

By way of example, fuel elements according to the invention will now be described with reference to the accompanying drawings in which:

FIGURES 1 and 2 are fragmentary side views in medial section.

FIGURE 1 shows an elongate cylindrical fuel element 1 for a nuclear reactor, the fuel element 1 comprising a cylindrical fuel member 2 and a heat insulating disc 2a enclosed in a close fitting sheath 3 having helical finning 4. The element 1 has a screw-fitted bottom end plug 5, the sheath 3 being welded to the plug 5 as shown at joint 6. The plug 5 has screwed into it a cone 7. The cone 7 has screwed into it an end coupling member in the form of a bayonet-type socket 8.

FIGURE 1 also shows a fuel element 9 similar to the fuel element 1. The fuel element 9 has a cylindrical fuel member 10 and a heat insulating disc 10a enclosed in a sheath 11 having helical finning 12. The element 9 also has a screw-fitted top plug 13 welded to it as shown at joint 14. The plug 13 has screwed into it a conical cup 15 having a transverse bore 16 in which is located and retained an end coupling member in the form of a bayonet pin 17.

The socket 8 has two diametrically opposed and oppositely inclined helical surfaces (one of which is shown and designated 18), and each surface 18 terminates at its lower end in a bayonet seat 19.

It will be appreciated that as the fuel elements 1, 9 are of similar construction, the fuel element 1 has at its upper end an end plug corresponding to the plug 13, a conical cup corresponding to the cup 15, and a bayonet pin corresponding to the pin 17. Also the fuel element 9 has at its lower end an end plug corresponding to the plug 5, a cone corresponding to the cone 7, and a bayonet socket corresponding to the socket 8.

The elements 1, 9 are connected together by inserting the pin 17 into the socket 8 so as to rest in the seats 19. Other elements are connected to the elements 1, 9 in a similar manner to form an assembly of connected elements. During charging of the assembly into the reactor from its top face, the assembly is in tension so that the pins 17 remain in the seats 19. When the charging operation is completed the lowermost fuel element of the assembly is supported in a vertical fuel element channel in the reactor from its lower end and supports the upper fuel elements so that the assembly is in compression. Under these conditions the helical surfaces 18 of the socket 8 ride over the pin 17 so rotating the fuel element 1 until the position shown in FIGURE 1 is reached. The socket 8 is dimensioned so that in this position a gap 20 exists above the pin 17, thereby ensuring that the cone 7 rests in the cup 15 and not on the pin 17. In this position the fuel element 1 (and similarly the other fuel elements of the assembly) can be discharged individually by withdrawal from the top of the reactor.

The helical surfaces 18 ensure that the pin 17 has line contact across the width of the surfaces 18 during rotation of the fuel element 1. In a typical assembly of six fuel elements, the sockets 8 may be alternately left and right handed.

In FIGURE 2, which shows an alternative form of the invention, a fuel element 21 has parts 22 to 26 corresponding to parts 2 to 6 of FIGURE 1. The plug 25 has screwed into it a cone 27 having a thrust face 28. An end coupling member in the form of a bayonet socket 29 has an internally screw-threaded sleeve 30 housed in a central bore 31 in the cone 27. A screw 32 engaging the internal thread of the sleeve 30 retains the sleeve 30 in the bore 31 whilst leaving the socket 29 free to rotate in the cone 27. The socket 29 has parts 33 to 35 corresponding to parts 18 to 20 of FIGURE 1. Also shown in FIGURE 2 is a fuel element 36 similar to the fuel element 21 and having parts 37 to 44 corresponding to parts 10 to 17 of FIGURE 1.

Following the connecting together of the fuel elements 21, 36 and other similar elements (as described above for the fuel elements 1, 9) and the subsequent charging of the assembly into the reactor, compression of the assembly results in the helical surfaces 33 riding over the pin 44 until the position shown in FIGURE 2 is reached. During this movement the socket 29 rotates against the thrust face 28 on the cone 27 and in this way there is no rotation of the fuel element 21.

The end coupling members described above with reference to the drawings are designed to allow for axial misalignment which occurs when assemblies of connected elements are charged into the reactor from a central charging chute which serves a number of fuel element channels. The end coupling members are confined within the circumferential profiles of the cups and cones thereby reducing disturbance to coolant flow over the fuel elements. The cups may be fitted with members for centering the fuel elements in their channels.

I claim:
1. Coupling means for use on elongate nuclear reactor fuel elements in coupling individual fuel elements together in a string comprising a cylindrical bayonet-type socket attached to an end of a first fuel element of a string, said socket defining two diametrically opposed and oppositely inclined helical cam surfaces terminating in a bayonet seat, and a bayonet pin attached to an end of a second fuel element of a string, said socket being rotatably engageable with said pin and said socket being automatically releasable upon the two adjacent fuel elements of a string being in compression.

2. Coupling means as claimed in claim 1 wherein the socket is rotatably attached to said first fuel element.

References Cited by the Examiner

UNITED STATES PATENTS

| | | | |
|---|---|---|---|
| 2,047,714 | 7/1936 | Smith | 285—402 |
| 3,072,430 | 1/1963 | Fahrenwald | 285—402 |
| 3,091,582 | 5/1963 | Bradley | 176—78 |
| 3,110,658 | 11/1963 | Guibert | 176—78 |
| 3,128,235 | 4/1964 | Hackney et al. | 176—77 |

FOREIGN PATENTS

| | | |
|---|---|---|
| 1,214,056 | 11/1959 | France. |
| 826,228 | 12/1959 | Great Britain. |

REUBEN EPSTEIN, *Primary Examiner.*

OSCAR R. VERTIZ, CARL D. QUARFORTH,
*Examiners.*

R. C. LYNE, R. L. GRUDZIECKI, *Assistant Examiners.*